United States Patent Office 3,427,788
Patented Feb. 18, 1969

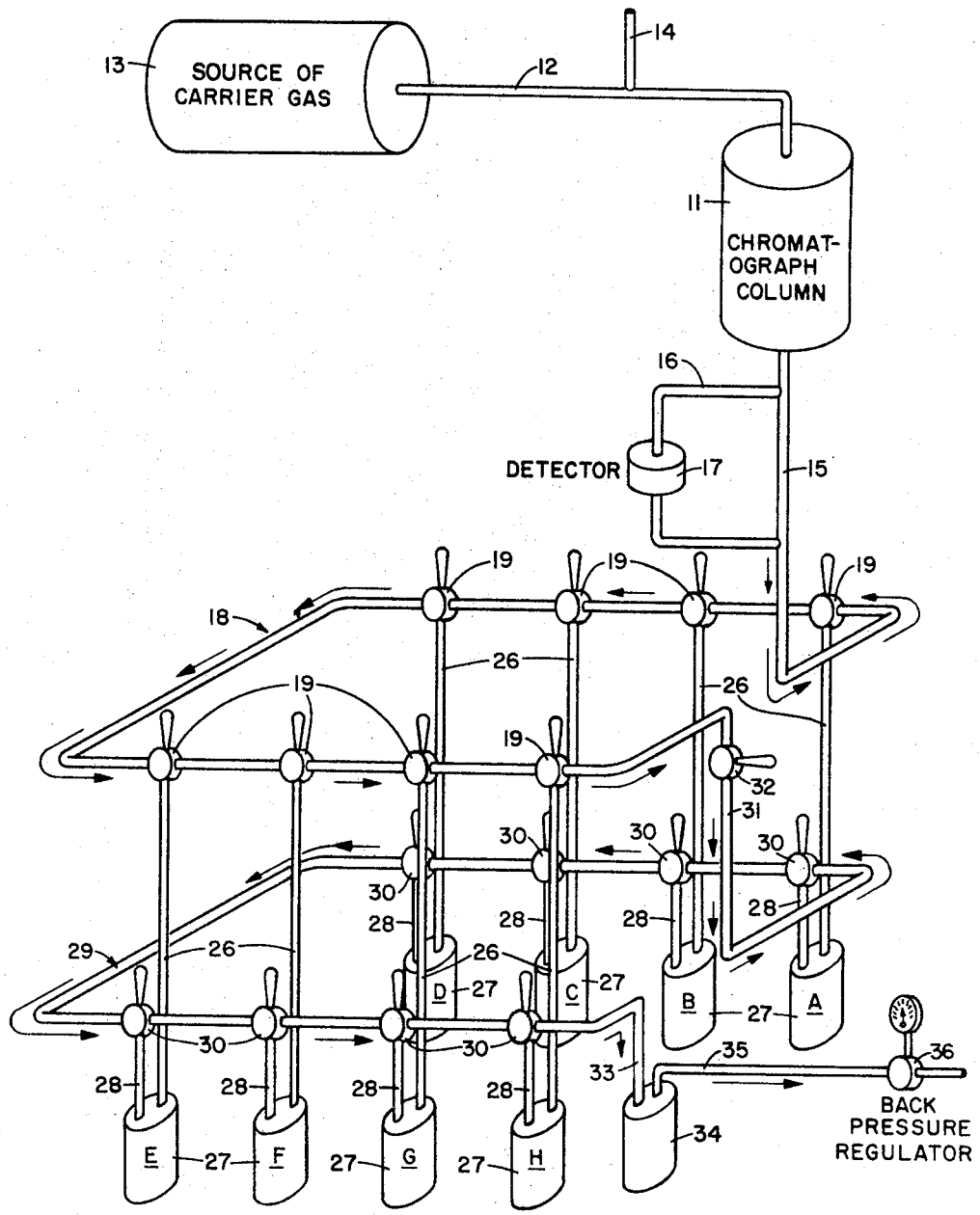

3,427,788
VALVED TRAP MANIFOLD
Alfred B. Carel, Denver, Colo., and William A. Bush, Ponca City, Okla., assignors to Continental Oil Company, Ponca City, Okla., a corporation of Delaware
Filed Sept. 12, 1966, Ser. No. 578,682
U.S. Cl. 55—197       5 Claims
Int. Cl. B01d 15/08

ABSTRACT OF THE DISCLOSURE

A trap system is provided comprising two headers connected serially, and a plurality of traps, each of which has its inlet connected to one of the headers, and its discharge connected to the other. Means are provided for selectively isolating each trap from its two connections to the headers, and for blocking serial flow between the two headers.

---

The present invention relates to a fluid flow network; and, in one aspect, the present invention relates to a flow network having special utility for handling effluent from a chromatographic column.

Within recent years, the art of chromatography has developed rapidly and many chemical compositions difficult to isolate have been readily obtained in a relatively pure form by the use of chromatographic columns. Due to the nature of the chromatographic phenomena, it is necessary to provide means for selectively trapping chemical components as they emerge from the column. Because it is ordinarily not practical to isolate and retain only a single component emerging from a chromatographic column, prior art apparatus is complete with various schemes for selectively trapping a plurality of components as they emerge from a chromatographic column. These prior art schemes are, however, subject to certain disadvantages. Quite commonly, for instance, it is necessary to trap each one of the components from a column in a programmed sequence before any of the components can be removed from a trap for additional analysis or utilization. A reasonable solution to these and other problems has, until the present invention, remained an elusive desideratum.

It is, therefore, an object of the present invention to provide a novel and improved fluid flow network.

An additional object of the present invention is to provide a novel trapping arrangement for utilization with a chromatographic column.

Another object of the present invention is to provide a flow network which can be sequentially controlled to isolate the individual components emerging from the chromatographic column.

Yet another object of the present invention is to provide a flow network comprising a plurality of traps, each of which may be isolated and removed from the network without interrupting flow in other portions of the network.

Another object of the present invention is to provide a flow network including a plurality of traps for utilization with a chromatographic column characterized in that samples emerging from the column are passed into a first selected trap and subsequently into a second trap whereby the samples are substantially completely removed from the system.

A further object of the present invention is to provide a trap network for utilization with a chromatographic column wherein the back pressure on the column may be effectively controlled.

Still another object of the present invention is to provide a trap network wherein the back pressure on the chromatographic column may be controlled and wherein the materials emerging from the column may be sequentially removed from the system without interrupting flow within the column.

These and other objects may be realized from utilization of the present invention which, in one form, may comprise a chromatographic column communicating with the inlet of a first header which in turn communicates with a second header through a plurality of valved lines including traps. In each of the valved lines, means may be provided for selectively and independently placing each of said traps into and out of communication with the first and second headers.

A more complete understanding of the present invention may be obtained from a perusal of the following written description in conjunction with an examination of the accompanying drawing wherein there is shown one form of the invention in combination with a chromatographic column 11 which communicates through a line 12 with a source of carrier gas 13. Likewise communicating with the chromatographic column through a portion of line 12 is a sample inlet indicated generally and schematically by the numeral 14. A conduit 15 is located downstream from chromatographic column 11 and is bypassed by a detector loop 16 having located therein a detector 17. A first header, indicated generally by the numeral 18, communicates with column 11 through conduit 15 and has fixed thereon a plurality of two-position valves 19, each of which allows passage of fluid through header 18 in the direction shown by the arrows in both positions of the valve. Each of the valves 19 may be positioned to allow flow of fluid downwardly through a vertical duct 26 to one of a plurality of first-pass traps 27. Traps 27 (separately designated A, B, C, D, E, F, G, H) may be any one of several types well-known in the art and may operate either by adsorption or by low-temperature phase change.

Each of the traps 27 has affixed thereto a riser 28 through which fluid flows from the trap to a second header 29. At the junction between each of the risers 28 and second header 29 is located a two-position valve 30 which, in one position, allows passage of fluid from riser 28 to header 29, while in both positions allows passage of fluid through header 29 in the direction of the arrows shown in the drawing.

In addition to the intercommunication between first header 18 and second header 29 through traps 27, another channel of communication is also provided by cross-over conduit 31 which may be opened or closed by a valve 32.

At the downstream end of second header 29 is provided an outlet duct 33 which leads into a second pass trap 34 and from thence into a conduit 35. A back pressure regulator 36 is located in conduit 35 for setting the pressure level of the flow network.

In a preferred manner of operation of the apparatus shown in the drawing, carrier gas is passed through chromatographic column 11 and into first header 18 via conduit 15 while valves 19 are positioned to prevent passage of the carrier gas into any of the ducts 26. With valve 32 positioned to allow fluid flow through cross-over conduit 31, carrier gas then enters second header 29 and passes through each of the valves 30 which are likewise positioned to prevent communication of traps 27 with header 29. On emergence from second header 29, the carrier gas passes from outlet duct 33 into second pass trap 34 and outwardly from the system through conduit 35. After flow is thus established in the system, a sample, usually in the gaseous phase, containing several chemical components is introduced to the system through inlet 14. From the inlet it is moved by the carrier gas in line 12 into the chromatographic column, whereupon the various chemical components of the sample are separated and emerge sequentially into conduit 15. A portion of the flow emerging from the chromatographic column will be shunted from conduit 15 into detector loop 16 where the presence of the individual chemical components is detected to allow interruption in an established flow pattern in the flow network. For instance, when the initial component emerges from the chromatographic column and is detected by detector 17, the position of valves 19 and 30 associated with the trap 27 designated A is changed, either manually or automatically, to allow fluid flow through the duct 26 associated with trap 27A through the trap and into second header 29 through a riser 28. Immediately after the opening of valves 19 and 30 to allow fluid flow to trap 27A, valve 32 is closed whereby further flow of vapors through cross-over conduit 31 ceases. Thereupon carrier gas with its associated component is forced through trap 27A. Within the trap substantially all of the component is removed and thereafter the carrier gas, which may or may not contain residual component, moves through riser 28, past valve 30 into lower header 29.

When all of the first component is collected, valve 32 is first opened to establish an additional channel of communication between upper header 18 and lower header 29 and the valves 19 and 30 associated with trap 27A are then closed. With the structural components in this position, carrier gas then flows through the complete network as indicated by the arrows in the drawing until a second component emerges from chromatographic column 11. As this transpires, valves 19 and 30 associated with trap 27B are opened followed by the closing of valve 32 and the trapping procedure described above for the first component is thus repeated for the second and later components until all of the traps, A through H, have been utilized.

It will be appreciated that a slight amount of each of the chemical samples will remain in the carrier gas and pass completely through the traps 27. Before the carrier gas can be re-cycled, it is necessary that these trace amounts of chemical components be substantially completely removed; and, for this purpose, second pass trap 34 is provided. If we assume that trap 34 is a low-temperature trap then it will be maintained at a temperature substantially lower than the boiling point of the lowest boiling component in the sample. In any event, second pass trap 34 is characterized in having the capacity to remove any of the chemical components from the carrier.

It will be understood that various changes in the details, materials, steps and arrangement of parts, which have been herein described and illustrated in order to explain the nature of the invention, may be made by those skilled in the art within the principle and scope of the invention.

What is claimed is:
1. A chromatographic system comprising:
 (a) a source of carrier gas;
 (b) a chromatographic column in communication with the source of carrier gas;
 (c) an inlet situated between the chromatographic column and the source of carrier gas which allows introduction of a chemical sample to the system;
 (d) a trap network comprising:
  (1) a first header having an inlet and an outlet;
  (2) a plurality of two-position valves located on said first header for interrupting the flow of fluid therein;
  (3) a plurality of ducts, each one of which communicates with the interior of one of said two-position valves, whereby flow is shunted from a portion of said first header into said duct upon motion of the two-position valve associated therewith;
  (4) a plurality of traps, each of which communicates with one of said ducts;
  (5) a plurality of risers, each of which communicates with the interior of one of said traps;
  (6) a second header having inlet and outlet and communicating with said traps through said risers;
  (7) a two-position valve situated on said second header at the junction of each of said risers and said second header;
  (8) a valved cross over conduit connecting the outlet of said first header with the inlet to the second header; and
  (9) a second pass trap downstream from the outlet of said second header; and
 (e) a conduit leading from the downstream end of said chromatographic column to the inlet of said trap network; and
 (f) a detector loop by-passing a portion of said last defined conduit.

2. A flow network comprising:
 (a) a first header having an inlet and an outlet;
 (b) a second header having an inlet communicating with the outlet of said first header and further having an outlet;
 (c) a plurality of traps, each of said traps having an inlet communicating with said first header and an outlet communicating with said second header;
 (d) valve means for selectively placing each of said trap inlets and trap outlets into and out of communication with said first and second headers respectively; and
 (e) means for interrupting communication between the outlet of said first header and the inlet of said second header.

3. Apparatus defined in claim 2 further comprising a second pass trap downstream from the outlet of the second header.

4. Apparatus defined in claim 3 wherein a back-pressure regulator is included downstream from the second pass trap.

5. Apparatus defined in claim 2 wherein said means for interrupting communication comprises an on-off valve.

References Cited

UNITED STATES PATENTS 3,245,269   4/1966   Ivie _____ 73—23.1

FOREIGN PATENTS 890,158   2/1962   Great Britain.

OTHER REFERENCES

Peurifoy, Paul V. et al.: "An Apparatus For Preparative-Scale Gas-Liquid Chromatography," Journal of Chromatography, 5, 1961, 418–429.

German printed application 1,122,293 January 1962, Pommer, 1 sht. dwg., 3 pp. spec. 73–23.1.

REUBEN FRIEDMAN, *Primary Examiner.*

J. L. DeCASARE, *Assistant Examiner.*

U.S. Cl. X.R.

137—119